United States Patent Office 2,857,341
Patented Oct. 21, 1958

2,857,341

STEEPING PROCESS FOR PREPARING FOAMABLE STYRENE POLYMER PARTICLES CONTAINING FATTY ACID COMPOUND

Robert E. Colwell and Norbert Platzer, Springfield, Mass., assignors to Monsanto Chemical Company, St. Louis, Mo., a corporation of Delaware No Drawing. Application December 28, 1955
Serial No. 555,798

8 Claims. (Cl. 260—2.5)

The present invention relates to a method for preparing foamable styrene polymer particles. More particularly, the present invention relates to an improved process for preparing foamable styrene polymer particles by steeping styrene polymer particles in a volatile aliphatic hydrocarbon.

Styrene polymer foams constitute a valuable class of materials which are finding increasingly wide application in the fabrication of numerous industrial and consumer articles such as life belts, insulation partitions, novelties, etc. A leading method for fabricating such foams involves placing small particles of a foamable styrene polymer in a mold and heating to foam the styrene polymer particles which fuse together to form a unitary structure. One method for preparing foamable styrene polymer particles comprises steeping styrene polymer particles in a volatile aliphatic hydrocarbon such as pentane, petroleum ethers, etc., until the styrene polymer particles have absorbed the desired quantity of the hydrocarbon, e. g., 5–10 weight percent. This process is extremely time consuming and up to 30 days may be required to absorb a sufficient quantity of the volatile aliphatic hydrocarbon, cf., Example V of U. S. 2,681,321. Moreover, the styrene polymer foams prepared from such foamable styrene polymer particles frequently are not as homogeneous as desired and may have an undesirably large cell size.

It is an object of this invention to provide an improved method for incorporating a volatile aliphatic hydrocarbon in styrene polymer particles.

Another object of this invention is to provide novel foamable styrene polymer particles having a volatile aliphatic hydrocarbon homogeneously incorporated therein.

Other objects and advantages of this invention will become apparent from the following detailed description thereof.

In accordance with the present invention, foamable styrene polymer particles are prepared by incorporating from about 0.5 part to about 20 parts of a fatty acid lubricant in 100 parts of a styrene polymer, comminuting the polymer composition into small particles and steeping said particles in a volatile aliphatic hydrocarbon boiling in the range of from about 10° C. to about 80° C. The fatty acid lubricant incorporated in the styrene polymer is selected from the class consisting of fatty acids containing 12 to 20 carbon atoms in their structure and the salts and monoesters thereof. Surprisingly, the styrene polymer particles containing small quantities of such fatty acid lubricants will absorb the volatile aliphatic hydrocarbon materially faster than will particles of an unmodified styrene polymer. Moreover, the styrene polymer foams prepared from the foamable styrene polymer particles of this invention are more homogeneous and have superior physical properties to styrene polymer foams that are prepared from comparable foamable styrene particles which do not contain a fatty acid lubricant.

The following examples are set forth to illustrate more clearly the principle and practice of this invention to those skilled in the art.

EXAMPLE I

Part A

One part of stearic acid is admixed with 100 parts of finely ground polystyrene having a molecular weight of 65,000. The externally blended mixture is put through an extruder to obtain a uniform distribution of the stearic acid throughout the resin. The extruded strands are ground to a particle size of 8–20 mesh.

Part B

The styrene polymer employed in Part A is extruded without incorporating stearic acid therein and is ground to a particle size of 8–20 mesh.

Part C

The ground polymers of Parts A and B are steeped separately in n-pentane at 25° C. under agitation for 24 hours. The polymer of Part A absorbs nearly twice as much petane as the polymer of Part B.

EXAMPLE II

Part A

Several styrene polymers are prepared as in Example I, Part A, except that the stearic acid is replaced with, respectively, an equal weight of lauric acid, calcium stearate, zinc stearate, sodium stearate, and butyl stearate.

Part B

The products of Part A above and a polystyrene control containing no lubricant are steeped in n-pentane under agitation for 24 hours at 25° C. The polymer particles containing a lubricant absorb approximately twice as much pentane as does the control.

EXAMPLE III

Part A

The two batches of foamable styrene particles prepared in Example I, Part C, are foamed by placing the particles in boiling water. The styrene particles containing the stearic acid give a foam having a density of approximately 5 lbs. per cubic foot, whereas, the control containing no stearic acid gives a foam having a density of approximately 9 lbs. per cubic foot.

Part B

The two batches of foamable styrene particles of Example I, Part C, are stored in sealed glass bottles for six months and are then foamed by placing the particles in a die and admitting steam thereto. The foam produced from the styrene particles containing the stearic acid is very fine with the cells having an average diameter in the range of 0.015–0.032 inch, whereas, the foam produced from the control styrene particles containing no stearic acid is relatively coarse with the cells having an average diameter of 0.05–0.08 inch. In addition, the foam prepared from the styrene particles containing the stearic acid has superior physical properties. Flexural strength and modulus of elasticity values as determined by ASTM procedure D790–49T are set forth below in Table I.

TABLE I

| Lubricant in Foamable Particles | Flexural Strength, p. s. i. | Modulus, p. s. i. |
|---|---|---|
| None | 13 | 235 |
| Stearic Acid | 56 | 1,700 |

The fatty acid lubricants incorporated in the styrene polymer are selected from the group consisting of fatty acids containing 12–20 carbon atoms in their structure and the salts and monoesters thereof. The monoesters of the fatty acids employed contain only one fatty acid group, thus, monoesters of polyhydric alcohols such as glyceryl monostearate are included within the scope of this invention, whereas, polyesters of polyhydric alcohols containing two or more fatty acid groups, e. g., glycerol distearate, are not. Typical examples of the fatty acid lubricants that may be employed include lauric acid, myristic acid, palmitic acid, oleic acid, stearic acid, hydroxystearic acid, sodium stearate, calcium stearate, aluminum stearate, zinc stearate, glyceryl monostearate, glyceryl mono-oleate, butyl stearate, amyl oleate, etc.

The styrene polymers in which the fatty acid lubricants are incorporated are homopolymers of styrene and interpolymers of styrene containing at least 85 weight percent of styrene. Any comonomer interpolymerized with the styrene should be free of inorganic and other polar substituents and will contain only the elements carbon, hydrogen, and sometimes oxygen. Examples of such comonomers include butadiene and the acrylate and methacrylate esters. All or part of the styrene may be replaced with its closely related homologues such as alpha-methylstyrene, vinyl toluene, p-ethylstyrene, 2,4-dimethylstyrene, etc.

Only a small quantity of the fatty acid lubricant need be incorporated in the styrene polymer to materially accelerate the rate at which the styrene polymer will absorb the volatile aliphatic hydrocarbon when steeped therein. As little as 0.5 part of fatty acid lubricant in 100 parts of styrene polymer materially accelerates the rate of hydrocarbon absorption and there appears to be little advantage in incorporating more than 20 parts of the fatty acid lubricant in 100 parts of the styrene polymer. It is preferred to incorporate from 0.5 to 3 parts of the fatty acid lubricant in 100 parts of the styrene polymer.

The fatty acid lubricants may be incorporated in the styrene polymer by conventional mixing methods or the fatty acid lubricants may be incorporated in the styrene monomer before it is polymerized.

The volatile aliphatic hydrocarbons employed to steep the particles of styrene polymer containing the fatty acid lubricant boil within the range of from about 10° C. to about 80° C. and preferably within the range of from about 30° C. to about 60° C. Examples of such hydrocarbons include pentane, cyclopentane, heptane, petroleum ethers boiling within the previously described temperature ranges, etc. It is permissible, and in some cases desirable, to admix other volatile organic liquids with the aliphatic hydrocarbon. In particular, good results frequently are obtained employing mixtures of volatile aliphatic hydrocarbons and lower halogenated hydrocarbons such as methylene chloride.

The steeping process employed is conventional except for the added material incorporated in the styrene polymer particle. For an optimum rate of hydrocarbon absorption, the styrene polymer particles should be comminuted to a fine particle size, e. g., less than about 10 mesh. In addition, the rate of hydrocarbon absorption is dependent on the temperature which may range from about 0° C. to the boiling point of the hydrocarbon or even higher if the absorption step is carried out under pressure. At room temperature or above sufficient agitation should be provided to prevent agglomeration of the styrene polymer particles. Where the styrene polymer composition is prepared by a suspension polymerization process, the volatile aliphatic hydrocarbon may be added to the polymerization vessel at the end of the polymerization with continued agitation to prepare the foamable styrene polymer particles.

The above descriptions and particularly the examples are set forth by way of illustration only. Many other modifications and variations thereof can be made without departing from the spirit and scope of the invention herein described.

What is claimed is:

1. The method for preparing foamable particles of a styrene polymer which consists of steeping particles of a styrene polymer composition in a liquid aliphatic hydrocarbon boiling within the range of about 10–80° C.; said styrene polymer composition consisting of 100 parts of a styrene polymer having about 0.5–20 parts of a fatty acid compound intimately incorporated throughout the styrene polymer; said styrene polymer being selected from the group consisting of (a) a homopolymer of a monomer selected from the group consisting of styrene, vinyl toluene, p-ethylstyrene, and 2,4-dimethylstyrene, (b) an interpolymer consisting solely of at least 2 monomers selected from the group consisting of styrene, alpha-methylstyrene, vinyl toluene, p-ethylstyrene and 2,4-dimethylstyrene, and (c) an interpolymer of at least 85 weight percent of a monomer selected from the group consisting of styrene, alpha-methylstyrene, vinyl toluene, p-ethylstyrene, 2,4-dimethylstyrene and mixtures thereof with up to 15 weight percent of butadiene; said fatty acid compound being selected from the group consisting of fatty acids containing 12–20 carbon atoms in their structure and the salts and monoesters thereof; said particles of the styrene polymer composition having an average particle size of less than 10 mesh.

2. The method of claim 1 in which 0.5–3 parts of the fatty acid compound are intimately incorporated in 100 parts of a styrene homopolymer.

3. The method of claim 2 in which the fatty acid compound employed is stearic acid.

4. The method of claim 2 in which the fatty acid compound employed is lauric acid.

5. The method of claim 2 in which the fatty acid compound employed is butyl stearate.

6. The method of claim 2 in which the fatty acid compound employed is calcium stearate.

7. The method of claim 2 in which the fatty acid compound employed is zinc stearate.

8. The method of claim 2 in which the fatty acid compound employed is sodium stearate.

References Cited in the file of this patent

UNITED STATES PATENTS

| | | |
|---|---|---|
| 2,317,137 | Fletcher | Apr. 20, 1943 |
| 2,330,108 | Bradshaw | Sept. 21, 1943 |
| 2,744,291 | Stastny et al. | May 8, 1956 |
| 2,681,321 | Stastny et al. | June 15, 1954 |
| 2,797,443 | Carlson | July 2, 1957 |